(12) United States Patent
Uemura et al.

(10) Patent No.: US 11,219,163 B2
(45) Date of Patent: Jan. 11, 2022

(54) LAWN MOWER WITH ENCLOSED CLIPPINGS BELT CONVEYOR

(71) Applicant: Kubota Corporation, Osaka (JP)

(72) Inventors: Katsuhiko Uemura, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 203 days.

(21) Appl. No.: 16/411,405

(22) Filed: May 14, 2019

(65) Prior Publication Data

US 2019/0380270 A1 Dec. 19, 2019

(30) Foreign Application Priority Data

Jun. 19, 2018 (JP) ............................. JP2018-116421

(51) Int. Cl.
*A01D 34/66* (2006.01)
*A01D 34/71* (2006.01)
*A01D 43/063* (2006.01)
*A01D 43/077* (2006.01)

(52) U.S. Cl.
CPC ....... *A01D 43/0635* (2013.01); *A01D 34/668* (2013.01); *A01D 34/71* (2013.01); *A01D 43/077* (2013.01)

(58) Field of Classification Search
CPC .. A01D 43/077; A01D 34/667; A01D 34/668; A01D 34/71; A01D 43/0635; A01D 43/063; A01D 43/0631; A01D 43/0638; A01D 43/0636; A01D 2101/00; A01D 34/64; A01D 43/06
See application file for complete search history.

(56) References Cited

U.S. PATENT DOCUMENTS

| 2,608,310 | A | * | 8/1952 | De Penning | ......... | A01D 43/077 |
| | | | | | | 414/335 |
| 2,632,989 | A | * | 3/1953 | Ross | .................... | A01D 43/077 |
| | | | | | | 56/14.4 |
| 2,848,862 | A | * | 8/1958 | Harrigan | .............. | A01D 43/063 |
| | | | | | | 56/199 |
| 3,134,214 | A | * | 5/1964 | Shaw | .................. | A01D 43/077 |
| | | | | | | 56/202 |

(Continued)

FOREIGN PATENT DOCUMENTS

| BE | 875877 A | 8/1979 | |
| EP | 0254657 A1 * | 1/1988 | ............. A01D 34/64 |

(Continued)

*Primary Examiner* — Alicia Torres
*Assistant Examiner* — Madeline Ivy Runco
(74) *Attorney, Agent, or Firm* — The Webb Law Firm (57) ABSTRACT

A lawn mower includes a mower device provided between a pair of right and left front wheels and a pair of right and left rear wheels and configured to mow grass on a traveling land surface; a grass collecting container provided rearwardly of a vehicle body, a conveyer duct extending between the mower device and the grass collecting container as extending through between the pair of right and left rear wheels and configured to convey grass clippings discharged from the mower device to the grass collecting container; and a belt conveyer configured to convey the grass clippings discharged from the mower device toward the grass collecting container. The belt conveyer forms a conveying bottom face of the conveyer duct.

7 Claims, 5 Drawing Sheets

(56) References Cited

U.S. PATENT DOCUMENTS

| | | | | |
|---|---|---|---|---|
| 3,237,390 A * | 3/1966 | Murphy | | A01D 78/06 56/376 |
| 3,309,147 A * | 3/1967 | Hook | | A01D 43/077 406/139 |
| 3,802,173 A * | 4/1974 | Opitz | | A01D 43/063 56/202 |
| 3,846,963 A * | 11/1974 | Pedigo | | A01D 34/49 56/13.3 |
| 3,969,876 A * | 7/1976 | Turos | | A01D 43/063 56/202 |
| 4,069,649 A * | 1/1978 | Mullet | | A01D 43/0633 56/14.5 |
| 4,151,702 A * | 5/1979 | Brown | | A01D 43/0631 56/16.6 |
| 4,262,475 A | 4/1981 | Takahashi et al. | | |
| 4,637,203 A * | 1/1987 | Fedeli | | A01D 43/0631 56/202 |
| 4,958,482 A * | 9/1990 | Soldavini | | A01D 34/64 56/14.3 |
| 5,018,346 A * | 5/1991 | Ishimaru | | A01D 43/0635 56/202 |
| 5,076,045 A * | 12/1991 | McClung, IV | | A01D 43/0635 56/202 |
| 5,189,870 A * | 3/1993 | Hohnl | | A01D 43/0631 56/16.6 |
| 5,870,889 A * | 2/1999 | Togoshi | | A01D 43/077 56/13.3 |
| 6,105,350 A * | 8/2000 | Vachon | | A01D 43/077 56/16.6 |
| 6,226,967 B1 | 5/2001 | Staiger | | |
| 6,360,517 B1 * | 3/2002 | Ishimori | | A01D 34/71 56/255 |
| 6,401,440 B1 * | 6/2002 | Franet | | A01D 43/077 56/16.6 |
| 6,484,486 B2 * | 11/2002 | Nagai | | A01D 43/063 56/16.8 |
| 6,513,312 B1 * | 2/2003 | Ishimori | | A01D 43/0635 56/202 |
| 6,591,596 B2 * | 7/2003 | Mauzizio | | A01D 43/0635 56/14.7 |
| 6,672,043 B2 * | 1/2004 | Shibata | | A01D 34/71 56/202 |
| 7,503,161 B1 * | 3/2009 | Mizukawa | | A01D 34/71 56/14.7 |
| 7,565,790 B2 * | 7/2009 | Uemura | | A01D 43/0636 56/194 |
| 8,122,695 B2 * | 2/2012 | Suhara | | A01D 43/0635 56/202 |
| 8,555,608 B2 * | 10/2013 | Geiger | | A01D 34/71 56/320.2 |
| 9,003,753 B2 * | 4/2015 | Yamamoto | | A01D 43/0635 56/202 |
| 9,801,341 B2 * | 10/2017 | Canonge | | A01D 43/063 |
| 9,872,434 B2 | 1/2018 | Skoog et al. | | |
| 2010/0095643 A1 * | 4/2010 | Keene, III | | A01D 43/0635 56/10.1 |
| 2014/0075900 A1 * | 3/2014 | Moroi | | A01D 43/063 56/2 |
| 2014/0200058 A1 * | 7/2014 | Barajas | | A01D 45/26 460/140 |
| 2016/0330904 A1 * | 11/2016 | Weitenberg | | A01D 57/00 |
| 2017/0265384 A1 * | 9/2017 | Tanabe | | A01D 34/667 |

FOREIGN PATENT DOCUMENTS

| | | | | |
|---|---|---|---|---|
| EP | 0532068 A1 * | 3/1993 | | A01D 34/68 |
| EP | 0917818 A1 | 5/1999 | | |
| JP | 10271903 A | 10/1998 | | |
| JP | 1191926 A | 4/1999 | | |
| JP | 20019380 A | 1/2001 | | |
| JP | 200145827 A | 2/2001 | | |
| JP | 200232 A | 1/2002 | | |
| JP | 2003210018 A | 7/2003 | | |
| JP | 2004298039 A | 10/2004 | | |
| JP | 2005287342 A | 10/2005 | | |
| JP | 2007131401 A | 5/2007 | | |
| JP | 200817781 A | 1/2008 | | |
| WO | 2017208050 A1 | 12/2017 | | |

* cited by examiner

LAWN MOWER WITH ENCLOSED CLIPPINGS BELT CONVEYOR

CROSS-REFERENCE TO RELATED APPLICATION

This application claims priority to Japanese Patent Application No. 2018-116421 filed Jun. 19, 2018, the disclosure of which is hereby incorporated by reference in its entirety.

BACKGROUND OF THE INVENTION

1. Field of the Invention

The present invention relates to a lawn mower including a vehicle body having a pair of right and left front wheels and a pair of right and left rear wheels, a mower device provided between the front wheels and the rear wheels and configured to mow (cut) grass or lawn on a traveling land surface, and a grass collecting container provided rearwardly of the vehicle body.

2. Description of the Related Art

In a grass mowing machine (lawn mower) disclosed in JP 2001-045827 A, a duct (corresponding to a "conveyer duct") for conveying grass clippings produced by a mower (corresponding to a "mower device") to a grass collecting container is disposed to extend between the mower and the grass collecting container, as extending through between the right and left rear wheels. A bottom wall of the duct is configured to be vertically pivotable and pivotally operable by an operational lever.

In a grass mowing machine (lawn mower) disclosed in JP 2008-017781 A, on lateral outer sides of a vehicle body, there are provided a conveyer duct that communicates a mower device with a grass collecting container and a blower device. Grass clippings produced by the mower device are conveyed by the conveyer duct and the blower device from the mower device to the grass collecting container.

Heavy grass clippings with high water content or the like tend to be stagnant within the conveyer duct. With the configuration of JP 2001-045827 A, in case lawn clippings or grass clippings stagnant in the conveyer duct are to be readily discharged by a pivotal movement of the bottom wall, this pivotal operation of the bottom wall is troublesome.

Further, with the configuration of JP 2008-017781 A, when the conveying force for the grass clippings is to be enhanced by the blower device, this blower device protrudes to the lateral outer side of the vehicle body, so that the lawn mower tends to be formed large. Further, although it is conceivable to e.g. increase the conveying force for the grass clippings by a screw conveyer, the lawn mower tends to be formed large in this case also. Moreover, such screw conveyer will provide a certain resistance against the conveyance of grass clippings under the conveying wind generated in the lawn mower, so that conveying air current will be wasted.

In view of the above, there remains need for a lawn mower which can avoid its physical enlargement or its weight, which yet can convey grass clippings smoothly to a grass collecting container and does not present any special trouble.

SUMMARY OF THE INVENTION

In view of the above, there is proposed a lawn mower having an arrangement as below:

A lawn mower comprising:
a vehicle body having a pair of right and left front wheels and a pair of right and left rear wheels;
a mower device provided between the front wheels and the rear wheels and configured to mow grass on a traveling land surface;
a grass collecting container provided rearwardly of the vehicle body;
a conveyer duct extending between the mower device and the grass collecting container as extending through between the pair of right and left rear wheels and configured to convey grass clippings discharged from the mower device to the grass collecting container; and
a belt conveyer configured to convey the grass clippings discharged from the mower device toward the grass collecting container, the belt conveyer forming a conveying bottom face of the conveyer duct.

With the above-described arrangement, if grass clippings discharged from the mower device to the conveyer duct are light, these will not stall (i.e. lose momentum) inside the conveyer duct and can be conveyed to the grass collecting container by a conveying wind generated in the mower device. Whereas, if the grass clippings discharged from the mower device to the conveyer duct are heavy and stall inside the conveyer duct, these will be received by the belt conveyer and conveyed via this belt conveyer to the grass collecting container.

Therefore, even in the case of heavy grass clippings, these will not stagnate within the conveyer duct and can be conveyed smoothly to the grass collecting container. Further, there is no need for any special trouble such as pivoting the bottom wall. Moreover, as the conveying wind generated in the mower device is not wasted, the arrangement requires only providing a belt conveyer at the bottom portion of the conveyer duct, so that there entails no significant enlargement or weight increase of the lawn mower.

According to one preferred embodiment, a conveying terminal end of the belt conveyer enters the inside of the grass collecting container.

With the above-described arrangement, when grass clippings conveyed by the conveyer drop off the conveying terminal end of the belt conveyer, they will drop inside the grass collecting container, so that the grass clippings can be held in the grass collecting container appropriately.

According to one preferred embodiment, the conveyer duct has a discharge opening which is open toward the rear side of the vehicle body;
the grass collecting container is configured to be pivotable between a lowered grass collecting posture and an elevated discharging posture about a pivot axis provided at an upper portion of the grass collecting container and extending in a vehicle body transverse direction, wherein under the lowered grass collecting posture, a grass clippings entrance/exit of the grass collecting container comes in opposition to the discharge opening; and under the elevated discharging posture, the grass clippings entrance/exit goes distant rearwardly and upwardly relative to the discharge opening;
wherein the lawn mower further comprises a blocking member disposed upwardly of the conveying terminal end; and
when the grass collecting container is switched to the elevated discharging posture, the blocking member enters an entrance/exit portion of the grass clippings entrance/exit corresponding to the conveying terminal end to block the entrance/exit portion.

With the above-described arrangement, when grass clippings are to be discharged from the grass collecting container set under the elevated discharging posture, the grass clippings are prevented from dropping off the entrance/exit portion as this entrance/exit portion of the grass clippings entrance/exit is blocked by the blocking member. Thus, it is readily possible to avoid dropping of grass clippings discharged from the grass collecting container onto the belt conveyer. If grass clippings were placed on the belt conveyer, this situation would require a trouble of removing the placed grass clippings or driving of the belt conveyer. Such trouble and driving can be eliminated advantageously.

According to one preferred embodiment, the blocking member forms a guide portion therein; and when the grass collecting container is switched to the elevated discharging posture, the guide portion causes grass clippings present inside the grass collecting container to be dropped to more rear side than the belt conveyer.

With the above-described arrangement, at time of discharging of grass clippings from the grass collecting container, in addition to the effect of prevention of dropping of grass clippings off the entrance/exit portion of the grass clippings entrance/exit due to the action of the blocking member, the grass clippings are guided to be dropped to more rear side than the belt conveyer as being guided by the guide portion, so that it is more readily possible to avoid dropping of grass clippings discharged from the grass collecting container onto the conveyer belt.

According to one preferred embodiment, the lawn mower further comprises a scraper provided at the conveying terminal end to act on the belt conveyer.

With the above-described arrangement, even grass clippings that tend to adhere, due to e.g. moisture thereof, to the conveying face of the belt conveyer, can be removed off the conveyer as receiving a scraping action of the scraper, so that they can be held in the grass collecting container appropriately.

According to one preferred embodiment, an electric motor is provided under the belt conveyer for driving the belt conveyer.

With the above-described arrangement, power can be transmitted to the belt conveyer from the vicinity of this belt conveyer. Whereby, as the electric motor can be driven simply by connecting an electric wire thereto, a driving arrangement for the belt conveyer can be readily obtained.

According to one preferred embodiment, a rotational speed of the electric motor is changeable.

With the above-described arrangement, in case the amount of grass clippings generated by the mower device is large, it is possible for instance to increase the feeding speed of the belt conveyer so as to avoid accumulation and stalling of the large amount of grass clippings on the belt conveyer. In this way, the driving speed of the belt conveyer can be adjusted in correspondence with e.g. the amount and/or properties of the grass clippings.

According to one preferred embodiment, a rear wheel drive shaft that transmits power to the rear wheels extends in the vehicle body transverse direction between a conveying path side portion and a returning path side portion of the belt conveyer.

With the above-described arrangement, in comparison with an arrangement wherein the rear wheel drive shaft extends beneath the returning path side portion of the belt conveyer, the conveying path side portion of the belt conveyer can be located at a low position relative to the upper wall portion of the conveyer duct. Thus, it is possible to configure a conveyer duct which allows smooth passage of grass clippings due to an increased spacing secured between the conveying path side portion of the belt conveyer and the upper wall portion of the conveyer duct.

The above-described arrangements can be provided particularly advantageously in a lawn mower configured such that a posture change (vertical pivoting) of the conveyer duct relative to vehicle body is not allowed.

Further and other characterizing features and advantages resulting therefrom will become apparent upon reading the following description.

DETAILED DESCRIPTION OF PREFERRED EMBODIMENTS

Figure 1:
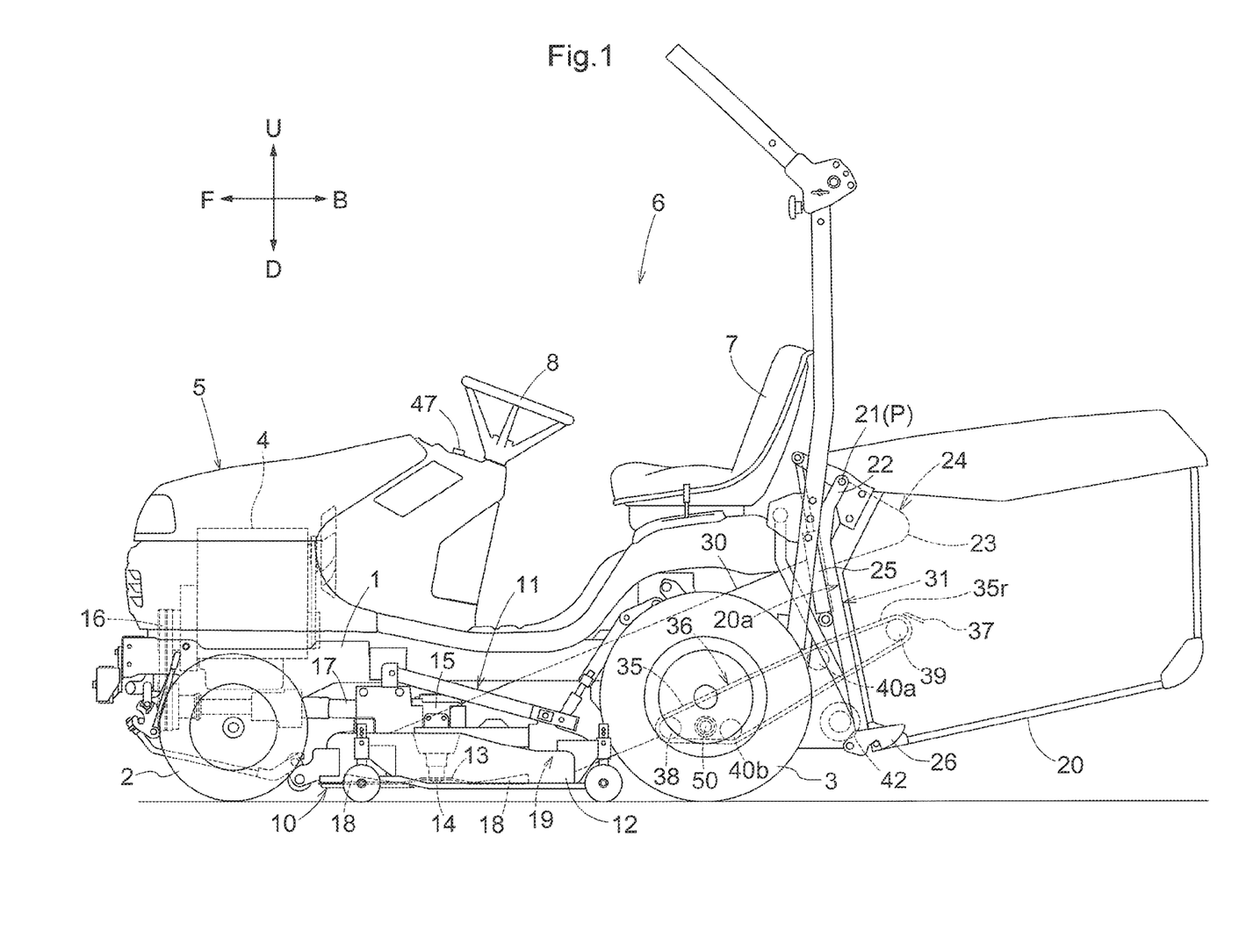
FIG. 1 is a left side view showing a lawn mower entirely.
Figure 3:
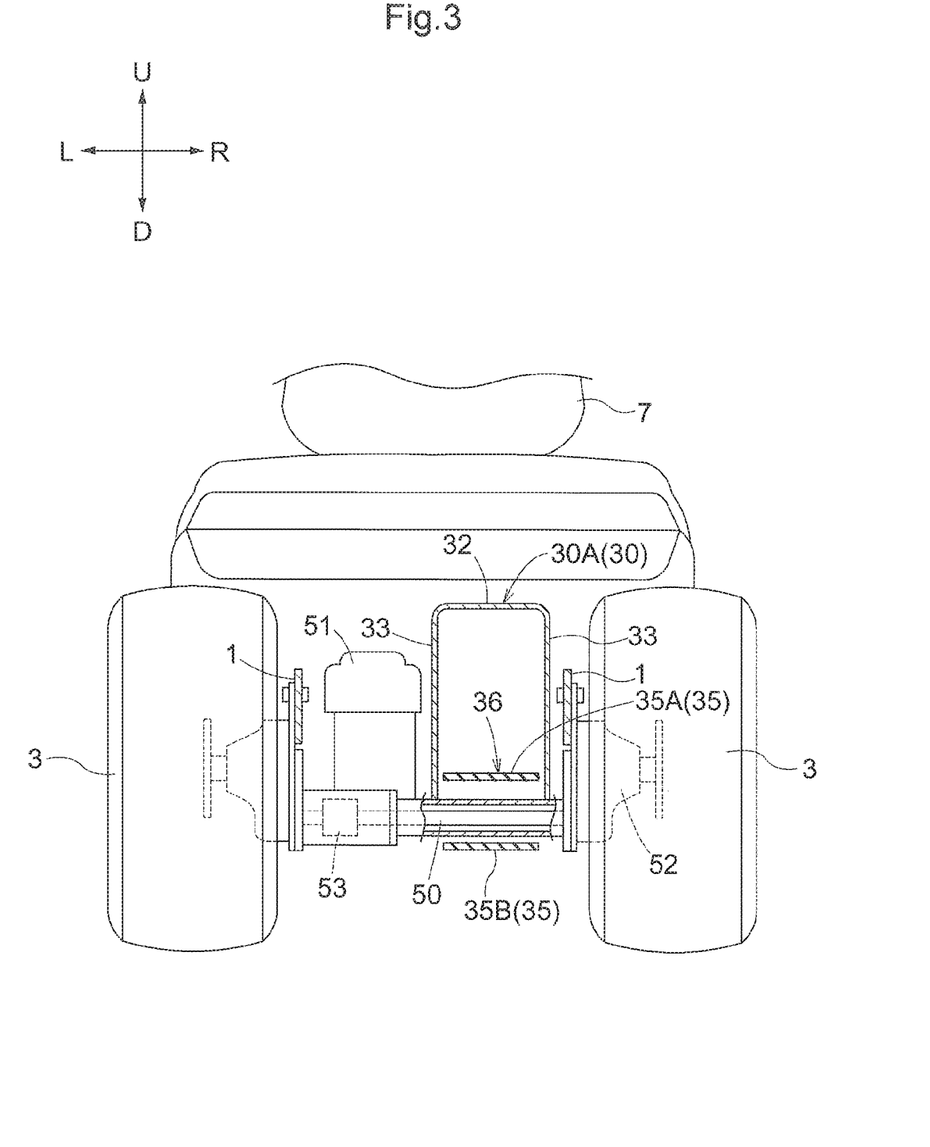
FIG. 3 is a rear view showing the conveyer duct.

In the following description, in connection with a vehicle body of a lawn mower, a direction denoted with an arrow F in FIG. 1 is defined as "vehicle body front side". A direction denoted with an arrow B is defined as "vehicle body rear side". A direction denoted with an arrow U in FIG. 1 and FIG. 3 is defined as "vehicle body upper side" and a direction denoted with an arrow D is defined as "vehicle body lower side". A direction denoted with an arrow L shown in FIG. 3 is defined as "vehicle body left side" and a direction denoted with an arrow R is defined as "vehicle body right side".

[General Arrangement of Lawn Mower]

As shown in FIG. 1, a lawn mower includes a vehicle body having a vehicle body frame 1, a pair of right and left front wheels 2 steerably and drivably mounted to front portions of the vehicle body frame 1, and a pair of right and left rear wheels 3 drivably mounted to rear portions of the vehicle body frame 1. At a front portion of the vehicle body, there is formed an engine section 5 including an engine 4. At a rear portion of the vehicle body, there is formed a riding type driving section 6. In this driving section 6, there are provided a driver's seat 7 and a steering wheel 8 for steering the front wheels 2. Between the front wheels 2 and the rear wheels 3, a mower device 10 is provided. Rearwardly of the vehicle body, a grass collecting container 20 is provided. Between the mower device 10 and the grass collecting container 20, a conveyer duct 30 is provided.

[Arrangement of Mower Device 10]

The mower device 10, as shown in FIG. 1, is supported to the vehicle body frame 1 via a link mechanism 11. An attaching height of the mower device 10 relative to the vehicle body is changed by a vertical pivotal operation of the link mechanism 11 relative to the vehicle body frame 1.

Figure 2:
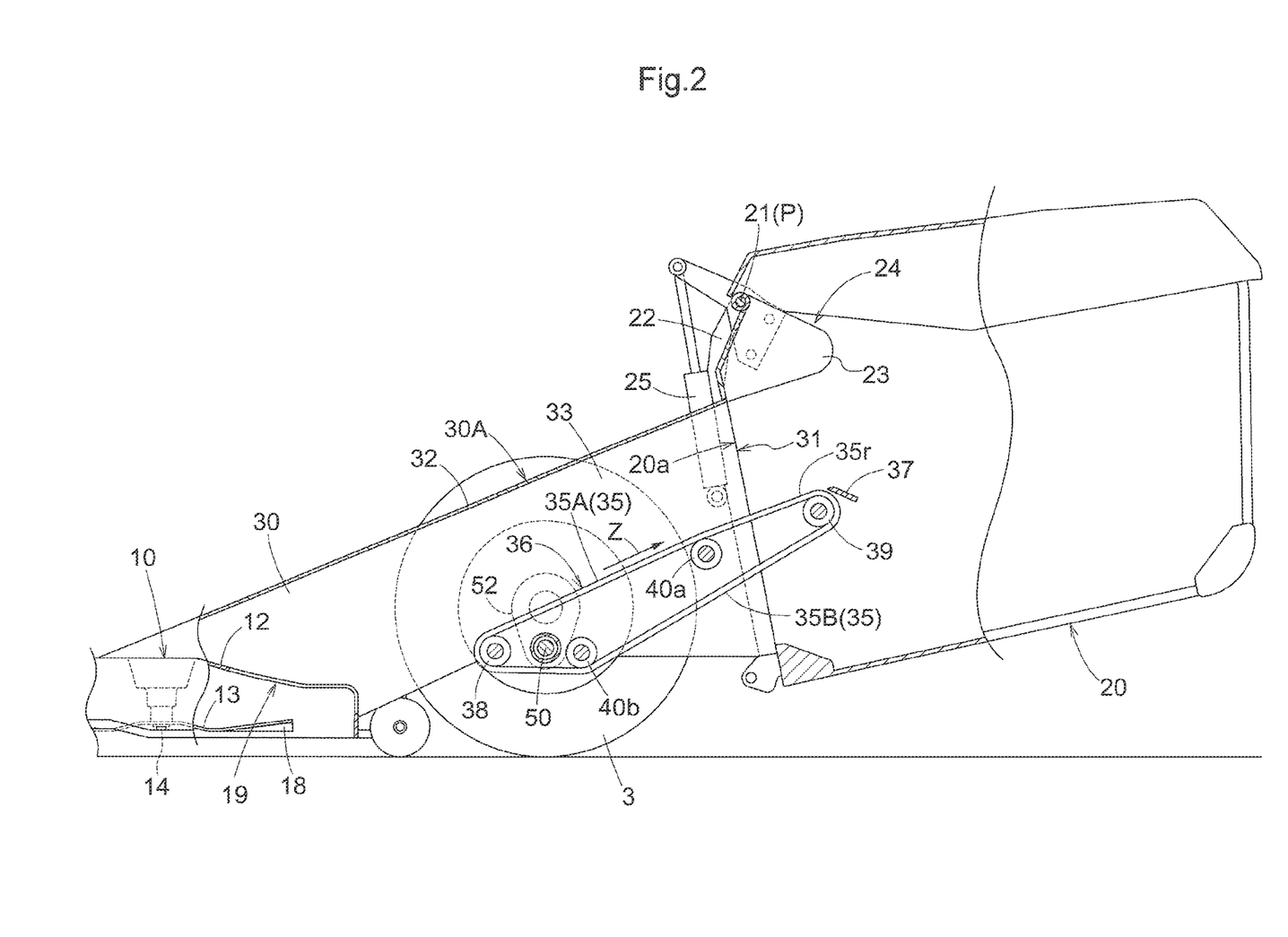
FIG. 2 is a side view in vertical section showing a conveyer duct under a grass mowing state.

The mower device 10, as shown in FIG. 1 and FIG. 2, includes a mower blade housing 12. Inside this mower blade housing 12, there are provided a plurality of rotary mower blades 13 disposed side by side in the vehicle body transverse direction. Each mower blade 13 is rotatably supported via a rotational support shaft 14 to the mower blade housing 12. On the upper face side of the mower blade housing 12, a driving case 15 is provided. The driving case 15 receives power of the engine 4 via a power transmission belt 16 and a rotational shaft 17. Power inputted to the driving case 15 is transmitted to the rotational support shafts 14 of the respective rotary mower blades 13. At opposed end portions of the respective mower blade 13, wind generator blades 18 are provided. At a rear portion of the mower blade housing 12, a grass clipping discharge opening 19 is opened.

In the mower device 10, each rotary mower blade 13 is rotatably driven by the power of the engine 4 inputted to the driving case 15 about an axis of the rotational support shaft 14 extending along the vehicle body vertical direction, so that weeds or lawn as "grass" on the traveling land surface are mowed/cut by the rotating rotary mower blade 13. The mowed grass clippings will be then discharged rearwards to the outside of the mower blade housing 12 through the grass clipping discharge opening 19 under the conveying wind generated by the wind generator blades 18.

[Arrangement of Conveyer Duct 30]

The conveyer duct 30, as shown in FIG. 1 and FIG. 3, is provided between the mower device 10 and the grass collecting container 20 as extending between the right and left rear wheels 3. The front end side of the conveyer duct 30, as shown in FIG. 2, is communicated to the grass clipping discharge opening 19 of the mower device 10. At the rear end portion of the conveyer duct 30, there is formed a discharge opening 31 which is opened toward the vehicle body rear side.

The conveyer duct 30, as shown in FIG. 2 and FIG. 3, includes a duct body 30A and a belt conveyer 35. The duct body 30A forms an upper wall portion 32 of the conveyer duct 30 and right and left side wall portions 33 of the conveyer duct 30. The belt conveyer 35 forms a conveying bottom face 36 of the conveyer duct 30. In the belt conveyer 35, a conveying terminal end 35r is provided to protrude rearwards via the discharge opening 31 of the conveyer duct 30. This conveying terminal end 35r, as shown in FIGS. 1 and 2, enters the inside of the grass collecting container 20 under a lowered grass collecting posture thereof. On the rear side of the conveying terminal end 35r of the belt conveyer 35, there is provided a scraper 37 which acts eon the conveying face of the belt conveyer 35.

Figure 5:
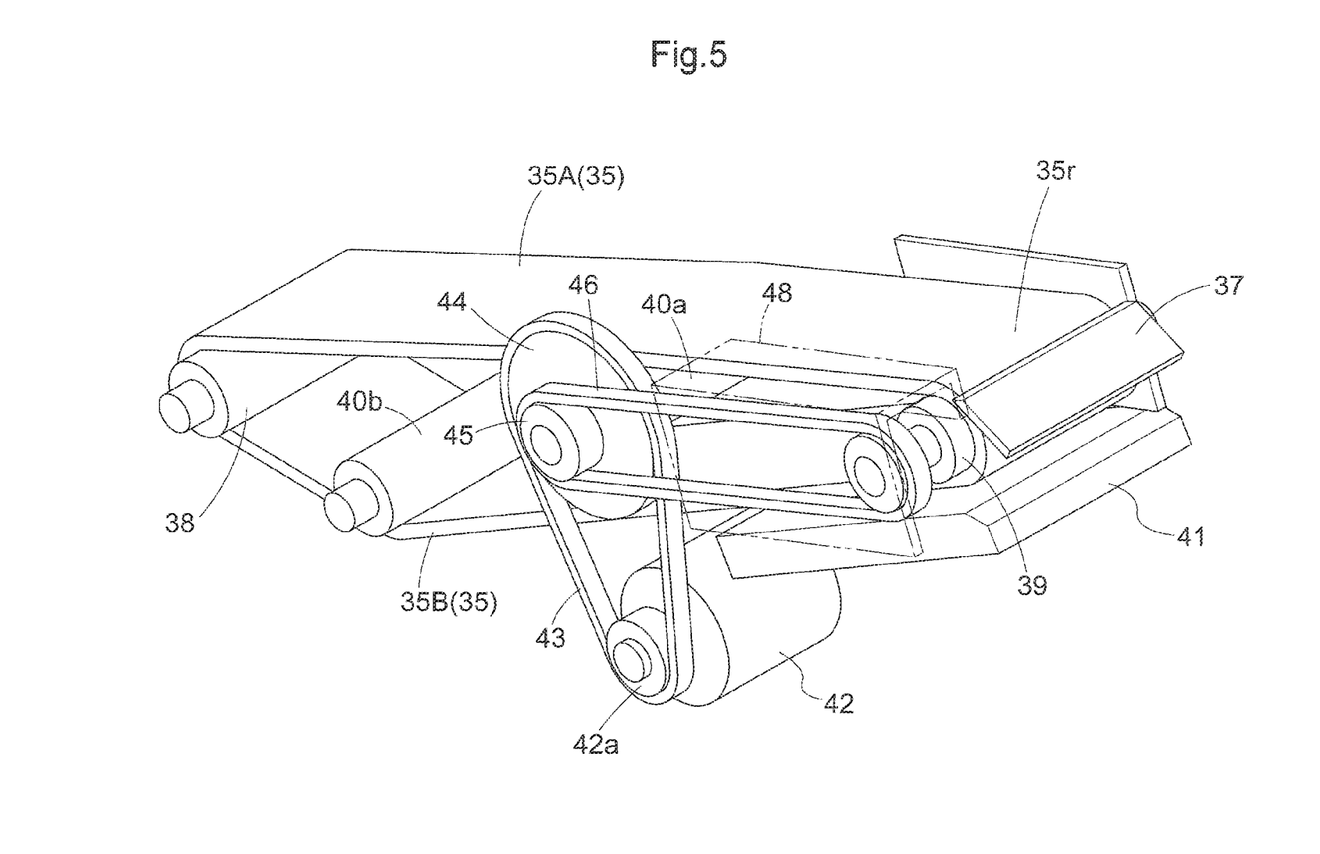
FIG. 5 is a perspective view showing a belt conveyer.

More particularly, the belt conveyer 35, as shown in FIG. 2, is wound around a conveying starting end side wheel body 38 provided between the right and left side wall portions 33, a conveying terminal end side wheel body 39 disposed outside the rear side of the conveying duct 30, and two guide wheel bodies 40a, 40b which are provided between the conveying starting end side wheel body 38 and the conveying terminal end side wheel body 39. The conveying starting end side wheel body 38 and the two guide wheel bodies 40a, 40b are rotatably supported to the right and left wall portions 33. The conveying terminal end side wheel body 39, as shown in FIG. 5, is supported to a support frame 41 to be rotatable relative thereto. The support frame 41 extends from the duct body 30A to the outside of the conveyer duct 30. The scraper 37 is supported to the support frame 41.

As shown in FIG. 5, the conveying terminal end side wheel body 39 and an output wheel body 42a of an electric motor 42 provided beneath the belt conveyer 35 are operably coupled to each other via a first power transmission belt 43, a first relay wheel body 44, a second relay wheel body 45 and a second power transmission belt 46. The electric motor 42 is provided, on the lower side of the belt conveyer 35, at a position thereof on more front side than the grass collecting container 20. The electric motor 42 is supported to the duct body 30A. A portion of the second power transmission belt 46, entering the inside of the grass collecting container 20 under the lowered grass collecting posture, is covered by a cover 48 from its upper side and opposed lateral sides. The first relay wheel body 44 and the second relay wheel body 45 are connected to be non-rotatable to each other. The first relay wheel body 44 and the second relay wheel body 45 are supported to the support shaft of the guide wheel body 40a. The belt conveyer 35 is rotatably driven in the rotation direction (see FIG. 2) denoted with an arrow Z by the conveying terminal end side wheel body 39 driven by the power of the electric motor 42. Namely, in the belt conveyer 35, a portion thereof guided by the upper side guide wheel body 40a forms a conveying path side portion 35A; and in the belt conveyer 35, a portion thereof guided by the lower side guide wheel body 40b forms a returning path side portion 35B.

As shown in FIG. 1, a speed adjusting switch 47 is provided in the driving section 6. This speed adjusting switch 47 is arranged to variably adjust the rotational speed of the electric motor 42 by operating a control section of this electric motor 42. By operating the speed adjusting switch 47, the driving speed of the belt conveyer 35 is changed, so that the conveying speed provided by the belt conveyer 35 can be changed.

The belt conveyer 35, as shown in FIG. 2 and FIG. 3, is provided in such a manner that a right rear wheel drive shaft 50 extends in the vehicle body transverse direction between the conveying path side portion 35A and the returning path side portion 35B. With the belt conveyer 35 forming the conveying bottom face 36 of the conveyer duct 30, wide spacing can be secured between the conveying bottom face 36 of the conveyer duct 30 and the upper wall portion 32.

The right rear wheel drive shaft 50, as shown in FIG. 3, is provided between a transmission case 51 disposed on the left lateral side of the conveyer duct 30 and a right rear wheel driving case 52 disposed on the right lateral side of the conveyer duct 30. In operation, power for driving the right rear wheel 3, outputted from a rear wheel differential mechanism 53 disposed inside the transmission case 51, is transmitted via the right rear wheel drive shaft 50 to the right rear wheel driving case 52, and from this right rear wheel driving case 52 to the right rear wheel 3.

In the conveyer duct 30, mowed grass or lawn clippings mowed by the mower device 10 will be discharged via the grass clipping discharge opening 19 under the conveying wind generated by the wind generator blades 18 to the inside of the front end portion of the conveyer duct 30. In case the discharged grass/lawn clippings do not stall inside the conveyer duct 30, the mowed grass/lawn clippings will be conveyed under the conveying wind which is discharged from the mower device 10 together with the grass/lawn clippings toward the grass collecting container 20. In case the discharged grass/lawn clippings have stalled inside the conveyer duct 30, the stalled grass/lawn clippings will be received by the conveying path side portion 35A of the conveyer belt 35 and then conveyed toward the grass collecting container 20 by the conveying path side portion 35A.

[Arrangement of Grass Collecting Container 20]

The grass collecting container 20, as shown in FIG. 1 and FIG. 2, includes a grass clipping entrance/exit 20a formed at a front portion of this grass collecting container 20. The grass collecting container 20, as shown in FIG. 1 and FIG. 2, is supported to a post 22 via a pivot shaft 21 provided at an upper portion of the grass collecting container 20. The pivot shaft 21 is disposed upwardly of the conveying terminal end portion 35r of the belt conveyer 35. The post 22 is mounted vertically at a rear portion of the vehicle body. Namely, the grass collecting container 20 is supported to be posture-switchable/changeable between a lowered grass collecting posture shown in FIG. 2 and an elevated discharging posture shown in FIG. 4, about a pivot axis P of the pivot shaft 21 extending in the vehicle body transverse direction. A posture changing (switching) operation of the grass collecting container 20 is done by an expanding/contracting operation of a lift cylinder 25 (see FIG. 1).

As shown in FIG. 2, when the grass collecting container 20 is changed in its posture to the lowered grass collecting posture, the grass collecting container 20 will be supported to the post 22 under an attachment posture in which the grass clipping entrance/exit 20a is placed in opposition to the discharge opening 31 of the conveyer duct 30, thus allowing receipt of the mowed grass/lawn clippings conveyed via the conveyer duct 30 by the grass collecting container 20. When the grass collecting container 20 is switched in its posture to the lowered grass collecting posture, the conveying terminal end 35r of the belt conveyer 35 enters the inside of the grass collecting container 20.

Figure 4:
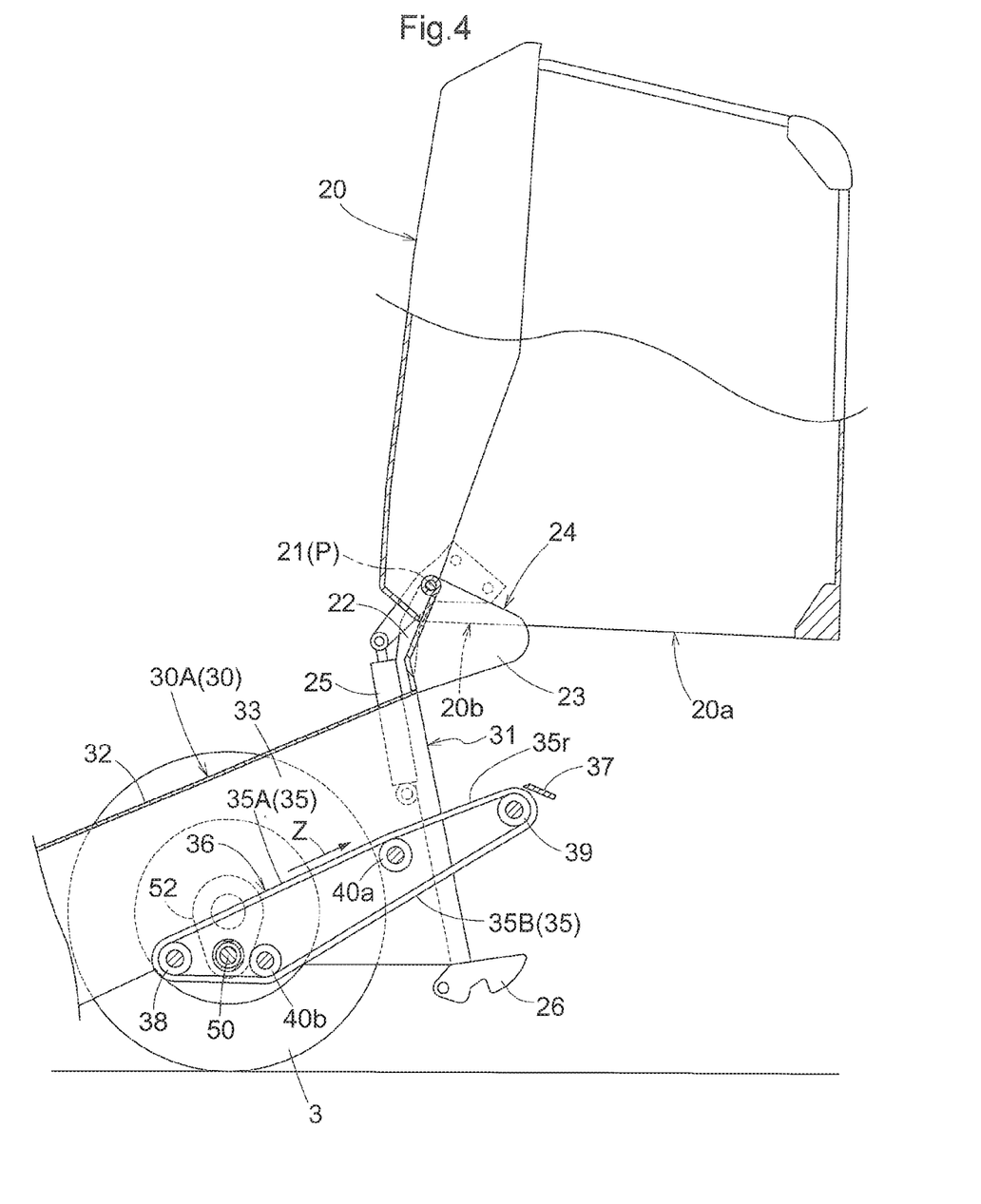
FIG. 4 is a left side view showing a grass collecting container under an elevated discharging posture.

As shown in FIG. 4, when the grass collecting container 20 is changed in its posture to the elevated discharging posture, the grass collecting container 20 will be supported to the post 22 under an attachment posture in which the grass clipping entrance/exit 20a is distant rearwardly and upwardly from the discharge opening 31 of the conveyer duct 30, thus allowing dropping of the mowed grass/lawn clippings present inside the grass collecting container 20 via the grass clipping entrance/exit 20a. When the grass collecting container 20 is changed in its posture to the elevated discharging posture, a blocking member 23 provided upwardly of the conveying terminal end 35r of the belt conveyer 35 enters the entrance/exit portion 20b of the grass clipping entrance/exit 20a corresponding to the conveying terminal end portion 35r, whereby the entrance/exit portion 20b is blocked by the blocking member 23. In case the grass collecting container 20 is changed in its posture to the elevated discharging posture, a guide portion 24 formed at an upper portion of the blocking member 23 is directed toward the inside of the grass collecting container 20, whereby mowed grass/lawn clippings exiting the grass collecting container 20 will be guided by the guide portion 24 to be dropped to more rear side than the belt conveyer 35. The blocking member 23 is supported to the post 22.

When a grass (lawn) mowing work is to be carried out, as shown in FIG. 2, the grass collecting container 20 will be set to a lowered storing posture. The grass collecting container 20 set under this lowered storing posture can be locked at this lowered storing posture by means of a hook 26 which is engageable with and disengageable from a lock pin of the grass collecting container 20. When the grass collecting container 20 is set to the lowered storing posture, mowed grass/lawn clippings mowed by the mower device 10 and discharged from the mower device 10 will be conveyed via the conveyer duct 30 and then stored in the grass collecting container 20. Namely, the mowed grass/lawn clippings discharged from the mower device 10 will be conveyed to the grass collecting container 20 under the conveying wind discharged from the mower device 10 or by the belt conveyer 35 of the conveyer duct 30. In case the mowed grass/lawn clippings are conveyed under the conveying wind, the mowed grass/lawn clippings, together with this conveying wind, will enter the grass collecting container 20 to be stored in this grass collecting container 20. Whereas, in case the mowed grass/lawn clippings are conveyed by the belt conveyer 35 to the grass collecting container 20, the mowed grass/lawn clippings will be dropped off the conveying terminal end portion 35r which has entered into the inside of the grass collecting conveyer 35 and scraped off the belt conveyer 35 by the scraper 37, and eventually stored in the grass collecting container 20.

When the mowed grass/lawn clippings stored in the grass collecting container 20 are to be discharged, the grass collecting container 20 will be changed in its posture to the elevated discharging posture as shown in FIG. 4. With this, since the grass clipping entrance/exit 20a of the grass collecting container 20 will be located distant rearwardly and upwardly from the discharge opening 31 of the conveyer duct 30, the mowed grass/lawn clippings present inside the grass collecting container 20 will now drop via the grass clipping entrance/exit 20a to exit the grass collecting container 20. When the grass collecting container 20 is changed in its posture to the elevated discharging posture, the entrance/exit portion 20b of the grass clipping entrance/exit 20a corresponding to the conveying terminal end portion 35r of the belt conveyer 35 will be blocked by the blocking member 23, so that the mowed grass/lawn clippings will be prevented from dropping from the entrance/exit portion 20b as this entrance/exit portion 20b corresponding to the conveying terminal end portion 35r of the conveyer belt 35 is blocked by the blocking member 23. Further, the mowed grass/lawn clippings exiting the grass collecting container 20 will be guided by the guide portion 24 to be dropped to more rear side than the belt conveyer 35. With this, dropping and subsequent accumulation of the mowed grass/lawn clippings discharged from the grass collecting container 20 onto the conveying terminal end portion 35r of the belt conveyer 35 can be avoided.

Other Embodiments (1) In the foregoing embodiment, there was shown an example in which the electric motor 42 is employed as the driving source for the belt conveyer 35. Instead of this, it is possible to embody the invention with using the engine 4 as the driving source. Further, in the foregoing embodiment, there was shown an example in which the electric motor 42 is disposed on the front outer side of the grass collecting container 20. Instead of this, it is also possible to employ an arrangement in which the electric motor 42 is disposed inside the grass collecting container 20 under the lowered grass collecting posture.

(2) In the foregoing embodiment, there was shown an example in which the conveying terminal end portion 35r of the belt conveyer 35 is located inside the grass collecting container 20. Instead of this, it is also possible to employ an arrangement in which the conveying terminal end portion 35r is disposed adjacent the discharging opening of the conveying duct 30, and does not enter the inside of the grass collecting container 20.

(3) In the foregoing embodiment, there was shown an example in which the scraper 37 is provided. Instead of this, it is also possible not to provide the scraper 37.

(4) In the foregoing embodiment, there was shown an example in which the rear wheel drive shaft 50 extends between the conveying path side portion 35A and the returning path portion 35B of the belt conveyer 35. Instead of this, the belt conveyer 35 may be provided with the rear wheel drive shaft 50 extending beneath the returning path side portion 35B.

(5) In the foregoing embodiment, there was shown an example in which mowed grass/lawn clippings are discharged from the grass collecting container 20 by switching this grass collecting container 20 in its posture to the elevated discharging posture. Instead of this, it is also possible to employ an arrangement in which the grass collecting container is supported to be non-changeable in its posture and the mowed grass/lawn clippings are discharged via an openable/closable opening of the grass collecting container.

What is claimed is:

1. A lawn mower comprising:
a vehicle frame;
a vehicle body having a pair of right and left front wheels mounted to a front portion of the vehicle frame, and a pair of right and left rear wheels mounted to a rear portion of the vehicle frame;
a mower device provided between the front wheels and the rear wheels and configured to mow grass on a traveling land surface;
a grass collecting container provided rearwardly of the vehicle body;
a conveyer duct extending between the mower device and the grass collecting container as extending through between the pair of right and left rear wheels and configured to convey grass clippings discharged from the mower device to the grass collecting container; and
a belt conveyer configured to convey the grass clippings discharged from the mower device toward the grass collecting container, the belt conveyer forming a conveying bottom face of the conveyer duct,
wherein a rear wheel drive shaft that transmits power to the rear wheels extends in the vehicle body transverse direction between a conveying path side portion and a returning path side portion of the belt conveyer.

2. The lawn mower as defined in claim 1, wherein a conveying terminal end of the belt conveyer enters the inside of the grass collecting container.

3. The lawn mower as defined in claim 2, wherein:
the conveyer duct has a discharge opening which is open toward the rear side of the vehicle body;
the grass collecting container is configured to be pivotable between a lowered grass collecting posture and an elevated discharging posture about a pivot axis provided at an upper portion of the grass collecting container and extending in a vehicle body transverse direction, wherein under the lowered grass collecting posture, a grass clippings entrance and exit of the grass collecting container comes in opposition to the discharge opening; and under the elevated discharging posture, the grass clippings entrance and exit goes distant rearwardly and upwardly relative to the discharge opening;
wherein the lawn mower further comprises a blocking member disposed upwardly of the conveying terminal end; and
when the grass collecting container is switched to the elevated discharging posture, the blocking member enters an entrance and exit portion of the grass clippings entrance and exit corresponding to the conveying terminal end to block the entrance and exit portion.

4. The lawn mower as defined in claim 3, wherein:
the blocking member forms a guide portion therein; and
when the grass collecting container is switched to the elevated discharging posture, the guide portion causes grass clippings present inside the grass collecting container to be dropped to more rear side than the belt conveyer.

5. The lawn mower as defined in claim 2, further comprising:
a scraper provided at the conveying terminal end to act on the belt conveyer.

6. The lawn mower as defined in claim 1, wherein:
an electric motor is provided under the belt conveyer for driving the belt conveyer.

7. The lawn mower as defined in claim 6, wherein a rotational speed of the electric motor is changeable.

* * * * *